(12) United States Patent
Specht et al.

(10) Patent No.: US 6,409,115 B1
(45) Date of Patent: Jun. 25, 2002

(54) SEAT BELT RETRACTOR

(75) Inventors: Martin Specht, Feldafing; Thomas Kilian, Germ, both of (DE)

(73) Assignee: Breed Automotive Technology, Inc., Lakeland, FL (US)

( * ) Notice: Subject to any disclaimer, the term of this patent is extended or adjusted under 35 U.S.C. 154(b) by 1 day.

(21) Appl. No.: 09/690,121

(22) Filed: Oct. 16, 2000

(30) Foreign Application Priority Data

Oct. 21, 1999 (DE) .......................................... 199 50 855

(51) Int. Cl.$^7$ .............................................. B65H 75/48
(52) U.S. Cl. ..................... 242/379.1; 280/805; 280/806
(58) Field of Search ....................... 242/379.1; 180/268; 280/801.1, 805, 806; 297/468, 470, 471, 472

(56) References Cited

U.S. PATENT DOCUMENTS

| | | | | |
|---|---|---|---|---|
| 3,402,899 A | * | 9/1968 | Wright, Jr. et al. | 242/107.4 |
| 4,515,326 A | * | 5/1985 | Karlsson | 242/107.4 |
| 4,925,124 A | * | 5/1990 | Hoyt et al. | 242/107.4 |
| 5,624,083 A | | 4/1997 | Modinger et al. | 242/374 |
| 6,105,893 A | * | 8/2000 | Schmidt et al. | 242/374 |
| 6,241,172 B1 | * | 6/2001 | Fugel et al. | 242/379.1 |

FOREIGN PATENT DOCUMENTS

| | | |
|---|---|---|
| DE | 1940867 | 2/1971 |
| DE | 2105999 | 8/1972 |
| DE | 2513739 | 10/1976 |
| DE | 4426479 | 2/1996 |
| DE | 19640842 | 4/1998 |
| DE | 19731689 | 2/1999 |
| DE | 19780583 | 1/2001 |
| DE | 19940034 | 4/2001 |
| EP | 1022201 | 12/1999 |
| WO | 9749583 | 12/1997 |

* cited by examiner

Primary Examiner—Donald P. Walsh
Assistant Examiner—Mark J. Beauchaine
(74) Attorney, Agent, or Firm—Jarett Rieger; Lonnie Drayer

(57) ABSTRACT

A seat belt retractor with a belt reel upon which the seat belt can be wound and unwound, and a force limiter composed of a deformable material which is arranged between at least one first reel part which can be blocked by a blocking device against rotation and at least one second reel part which is rotatable upon energy consumption of the force limiter, an inertial mass being capable of being coupled to the second reel part for entrainment by means of a coupling which is engaged upon blocking of the first reel part and rotation of the second reel part.

16 Claims, 2 Drawing Sheets

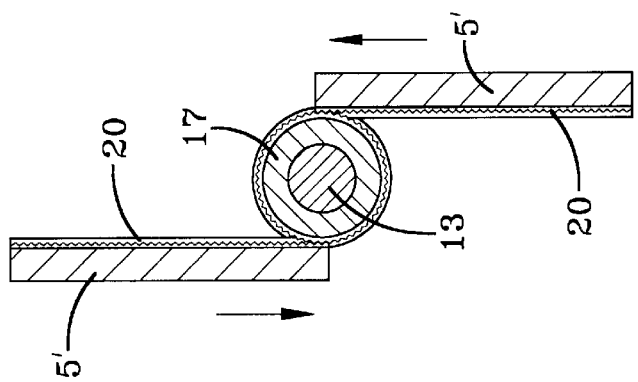
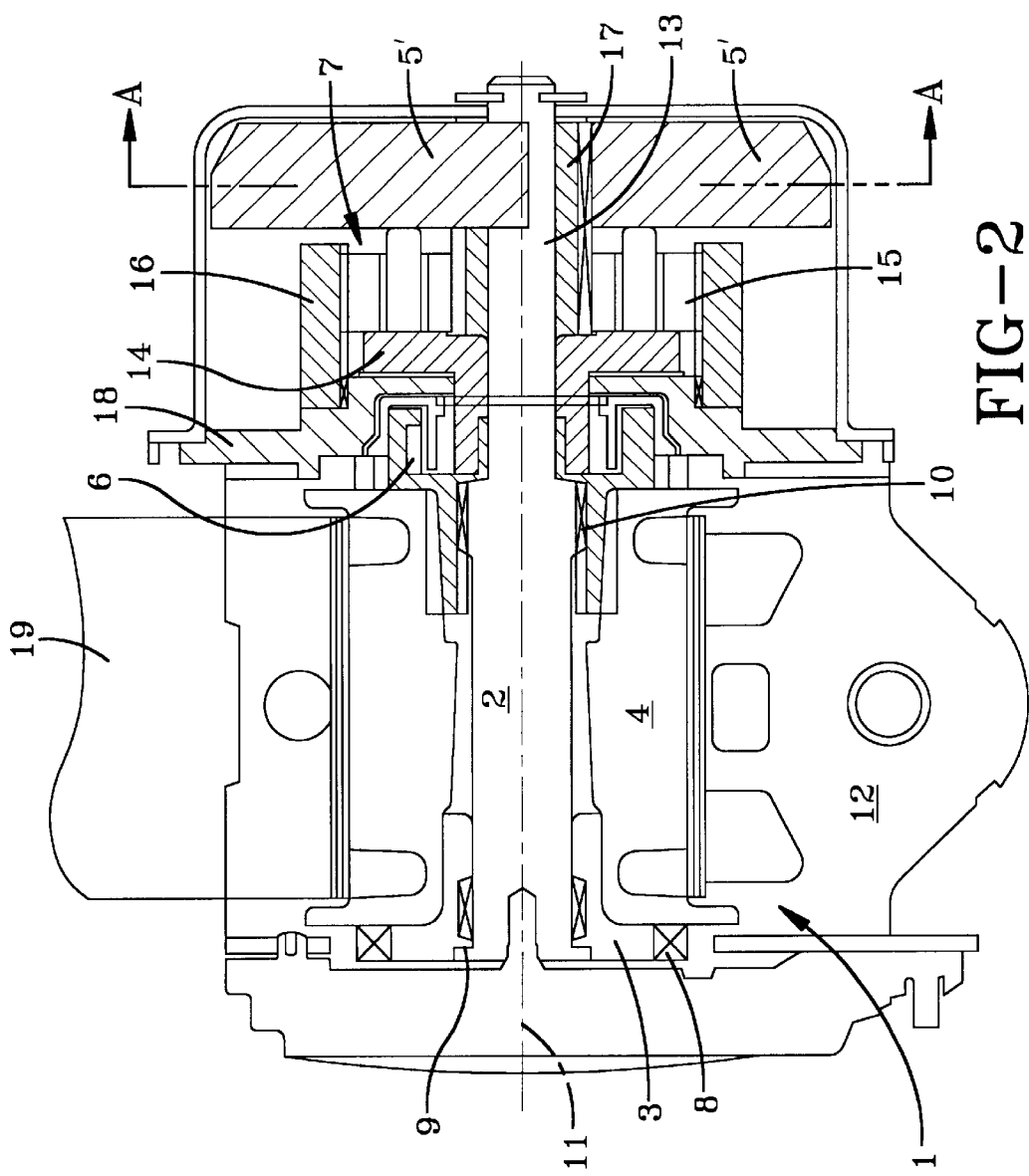

SEAT BELT RETRACTOR

FIELD OF THE INVENTION

The present invention relates to a seat belt retractor having a force limiter comprising a deformable material.

DISCUSSION OF THE PRIOR ART

DE 44 26 479 C2 teaches a seat belt retractor wherein in a vehicle crash the pressure of the seat belt on the forward-displaced body of the strapped-in vehicle occupant is reduced by the force limiter, as a limited extraction of the belt webbing is made possible with the consumption of energy.

A force limiter in the form of brake discs is known from DE-OS 19 40 867, wherein the braking force can be adjusted by means of an adjusting device as a function of the body weight of the strapped-in vehicle occupant.

SUMMARY OF THE INVENTION

There is provided in accordance with the present invention a belt retractor of the type described at the beginning in which an automatic adjustment of the force limiting effect is achieved with little expenditure as a function of the data concerning the vehicle occupant and of the respective crash severity. An inertial mass can be coupled to the second reel part for entrainment by a coupling which is engaged upon blocking of the first reel part and rotation of the second reel part. The inertial mass can be mounted so as to be linearly or rotatably moveable for entrainment.

Preferably step-up gearing can be provided between the second reel part, rotatable upon energy consumption by the force limiter, and the inertial mass. As a result, the effect of the inertial mass on the belt reel can be increased. The inertial mass can be coupled directly via the coupling or via the force limiter to the second reel part. Preferably the force limiter is a torsion bar. To this end, the torsion bar can extend in known manner into the axis of the belt reel, which is hollow on the inside. The force limiter can also be present in the form of friction linings (DE 196 40 842 C2 or DE 197 31 689 C2).

Preferably the force limiter function imparted by the force limiter is designed for a fifth percentile woman. In the crash severity spectrum arising in practice, the lowest rotational speed of the rotatable belt reel part is brought about by such a person strapped in, upon forward displacement in dependence on the respective crash severity. If the person strapped in is of larger dimensions with regard to body weight and body size, corresponding for example to the norm approximately of a 50th percentile man or more (up to a 95th percentile man), the rotational speed of the rotatable reel part will be greater upon forward displacement with the same degree of crash severity. Accordingly, the inertial mass coupled via the coupling acts with increasing inertial force as a reaction force on the rotating reel part or the torsion bar connected to this reel part in the sense of a variable braking force, which is being added thereto.

A self-adjusting influencing of the effect of the force limiter is therefore achieved by the invention from the body data of the person strapped in and the crash severity.

BRIEF DESCRIPTION OF THE DRAWINGS

The invention will be explained in more detail by embodiments with the aid of drawings, in which:

FIG. 2 shows a second embodiment;
and
FIG. 3 shows a sectional view along the section line A—A in FIG. 2.

DETAILED DESCRIPTION OF THE INVENTION

Figure 1:
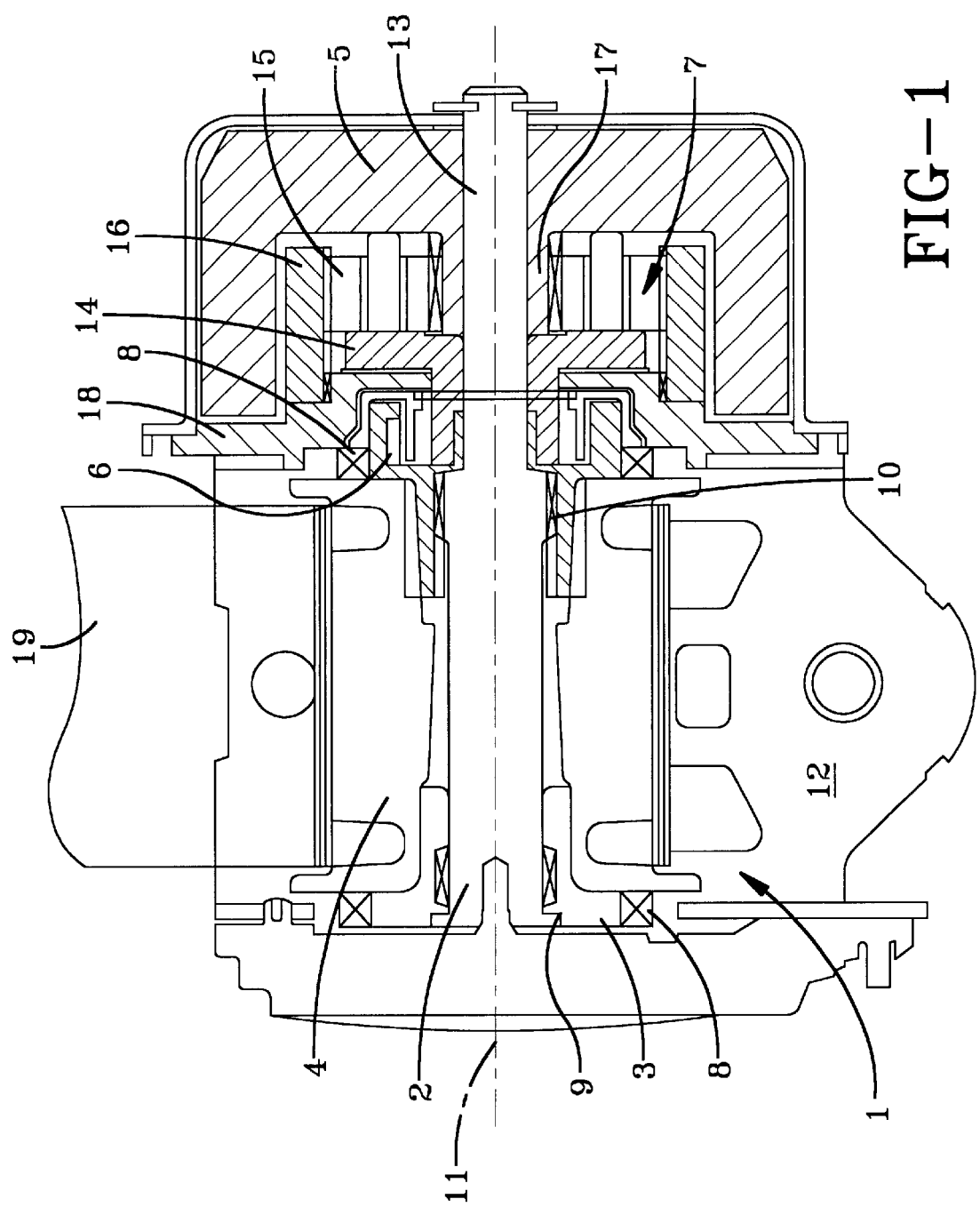
FIG. 1 shows a first embodiment.

The belt retractors illustrated in the figures have a belt reel 1 upon which a seat belt 19 can be wound and unwound. The belt reel 1 has blocking discs with peripheral blocking teeth 8 on its two lateral ends. These blocking discs form a first blockable reel part 3. The blocking can be triggered in known manner in response to the vehicle or in response to the belt webbing and can optionally act after pretensioning of the seat belt 19 by means of a pretensioning device not illustrated in detail.

The belt reel 1 also has a rotatable reel body 4. The 4 reel body is hollow and a force limiter 2 in the form of a torsion bar extends through the hollow space. The force limiter 2 is connected non-rotatably at its left end to the left blocking disc, which forms one of the two blockable reel parts 3, in a fixed bearing 9. On the right-hand side, the force limiter 2, which is a torsion bar, is connected non-rotatably to the rotatable 4 body reel, for example via a serration 10 or the like. During normal operation, the belt reel 1 is rotatably mounted about a reel axis 11 relative to a belt retractor frame 12.

The force limiter 2 has a bearing journal 13 coaxial with the reel axis 11 at its right end. The bearing journal 13 is preferably connected integrally to the force limiter 2 and forms an axial extension of the bar piece of the force limiter 2. An inertial mass 5 is rotatably mounted on the bearing journal 13 in the embodiment of FIG. 1. The inertial mass 5 has a hood shape and in the inside of the hood of the inertial mass 5 there is located a gear 7 which is preferably a planetary gear. The planetary gear has a planet carrier 14 that is rotatably mounted on the bearing journal 13. At least one planet wheel 15 is rotatably mounted on the planet carrier 14. The planet wheel 15 meshes with a stationary ring gear 16 secured to the belt retractor frame 12. An adapter flange 18, as described in DE 199 40 034 A1, can be provided for securing the ring gear 16. A bearing bushing is formed on the hood-shaped inertial mass 5 and forms a sun wheel 17 of the planetary gear. The sun wheel 17 is rotatably mounted on the bearing journal 13. The planet wheel 15 meshes both with the ring gear 16, non-rotatably mounted on the belt retractor frame 12, and with the sun wheel 17. Corresponding teeth are provided on this end on the planet wheel 15, on the ring gear 16 and on the sun wheel 17.

The reel body 4 can be coupled via the gear 7 to the inertial mass 5 via a coupling 6, as will be described in more detail. The coupling can be designed in the manner described in DE 199 40 034 A1. During normal belt retractor operation the coupling 6 is in a disengaged state. In the case of blocking of the blocking discs (blockable reel part 3), the blocking discs are secured against rotation, for example in a crash. During a forward displacement of the body of the strapped-in vehicle occupant, the reel body 4 can rotate against the restraining force of the force limiter 2 which is secured non-rotatably in the fixed bearing 9 with the left blocking disc on the belt retractor frame 12. During this rotation the coupling 6 is engaged, as described in DE 199 40 034 A1. As a result, the reel body (rotatable reel part 4) is brought into rotating drive connection with the inertial mass 5 via the gear 7.

The force limiter 2 is designed in its force limiting effect for the standardised size of a 5th percentile woman. If the person involved in a crash has body data which approximately correspond to this standard size, there will be a relatively low rotational speed upon extraction of the belt webbing decelerated by the force limiter 2 as a function of the respective crash severity. The additional braking action emanating from the coupled inertial mass 5 will therefore be only slight. If the body data of the person involved in a crash correspond approximately to a 50th percentile man, or more (95th percentile man), the rotational speed of the rotatable reel part 4 increases upon forward displacement as a function thereof. The braking action on the rotatable reel part 4 (reel body) resulting from the inertial force from the coupled inertial mass 5 thereby increases accordingly. This decelerating or braking effect is added to the braking effect exerted by the force limiter 2. This braking effect, which results from the inertial force produced by the coupled inertial mass 5, is proportional to the body data of the strapped-in person involved in a crash and to the crash severity. This additional braking force is added to the braking force produced by the force limiter 2. A force limiting system is therefore produced which automatically acts proportionally to the body data of the person involved in a crash and to the crash severity.

In order to increase the inertial force on the rotatable reel part 4 or the force limiter 2 resulting from the coupled inertial mass 5, the gear 7 can be step-up gearing starting from the rotatable reel part 4 to the inertial mass 5.

A belt webbing extraction length which is substantially the same in each case and a corresponding automatically adjusted force limitation is therefore achieved with the invention in the dynamic short time period of the course of the crash in a large spectrum of crash severity and body data of the strapped-in person.

In the embodiment of FIG. 1 the inertial mass 5 is rotatably mounted. It is also possible, however, to mount the inertial mass so as to be linearly moveable as shown in the embodiment of FIGS. 2 and 3. In this embodiment two solid bodies are provided which form an inertial mass 5'. The two solid bodies 5' optionally have one-piece toothed racks 20 which mesh with the sun wheel 17 rotatably mounted on the bearing journal 13. With engaged coupling 6, the rotational movement of the sun wheel 17 is transmitted to the two solid bodies 5', so that they are moved linearly in opposing directions to one another. One solid body only can also be used to form the inertial mass 5' instead of two solid bodies 5.

It is understood that the invention is not limited to the particular construction and arrangement of parts herein illustrated and described, but embraces such modified forms thereof as come within the scope of the following claims.

What is claimed is :

1. A seat belt retractor comprising a belt reel upon which a seat belt can be wound and unwound, and a force limiter comprising an energy-consuming material that is arranged between at least one first reel part that can be blocked by a blocking device against rotation and at least one second reel part that is rotatable upon energy consumption of the force limiter, wherein an inertial mass can be coupled to the second reel part for entrainment by means of a coupling, which is engaged upon blocking of the first reel part and rotation of the second reel part.

2. The seat belt retractor according to claim 1 wherein the inertial mass is mounted so as to be rotatably or linearly moveable for entrainment.

3. The seat belt retractor according to claim 2 wherein a step-up gear is provided between the second reel part and the inertial mass.

4. The seat belt retractor according to claim 3 wherein the inertial mass can be coupled to the force limiter by means of the coupling.

5. The seat belt retractor according to claim 3 wherein the force limiter is a torsion bar.

6. The seat belt retractor according to claim 2 wherein the inertial mass can be coupled to the force limiter by means of the coupling.

7. The seat belt retractor according to claim 6 wherein the force limiter is a torsion bar.

8. The seat belt retractor according to claim 2 wherein the force limiter is a torsion bar.

9. The seat belt retractor according to claim 1 wherein a step-up gear is provided between the second reel part and the inertial mass.

10. The seat belt retractor according to claim 9 wherein the inertial mass can be coupled to the force limiter by means of the coupling.

11. The seat belt retractor according to claim 10 wherein the force limiter is a torsion bar.

12. The seat belt retractor according to claim 9 wherein the force limiter is a torsion bar.

13. The seat belt retractor according to claim 1 wherein the inertial mass can be coupled to the force limiter by means of the coupling.

14. The seat belt retractor according to claim 13 wherein the force limiter is a torsion bar.

15. The seat belt retractor according to claim 1 wherein the force limiting effect produced by the force limiter is designed for a 5th percentile woman.

16. The seat belt retractor according to claim 1 wherein the force limiter is a torsion bar.

* * * * *